United States Patent [19]

Coplin et al.

[11] Patent Number: 4,793,134
[45] Date of Patent: Dec. 27, 1988

[54] FLUID PROPULSION ENGINE WITH FLOW EXIT CONTROL DEVICE

[75] Inventors: John F. Coplin; Rowan H. Colley, both of Derby, England

[73] Assignee: Rolls-Royce plc, London, England

[21] Appl. No.: 114,731

[22] Filed: Oct. 30, 1987

[30] Foreign Application Priority Data

Dec. 17, 1986 [GB] United Kingdom ................. 8630178

[51] Int. Cl.$^4$ .............................................. F02K 3/04
[52] U.S. Cl. ................................ 60/226.1; 60/226.2; 60/230; 60/271; 239/265.31
[58] Field of Search ............... 60/226.2, 229, 230, 60/242, 271, 226.1; 239/265.31, 265.29, 265.27, 265.19, 265.33; 244/110 B

[56] References Cited

U.S. PATENT DOCUMENTS

| 2,931,172 | 5/1960 | Billman | 239/265.29 |
| 3,036,431 | 5/1962 | Vdolek | 239/265.31 |
| 3,503,211 | 3/1970 | Medawar et al. | 60/226.2 |
| 3,897,001 | 7/1975 | Helmintoller, Jr. et al. | 60/226.2 |
| 4,013,226 | 3/1977 | Willard | 239/265.29 |
| 4,313,581 | 2/1982 | Folmer et al. | 60/226.2 |
| 4,356,973 | 11/1982 | Lawson | 60/226.2 |

FOREIGN PATENT DOCUMENTS 2216220 10/1972 Fed. Rep. of Germany ..... 60/226.2

Primary Examiner—Donald E. Stout
Attorney, Agent, or Firm—Cushman, Darby & Cushman

[57] ABSTRACT

A common mechanism enables both throat area change in either a fan duct or an exhaust gas duct and flow deflection at the nozzle of the duct.

8 Claims, 3 Drawing Sheets

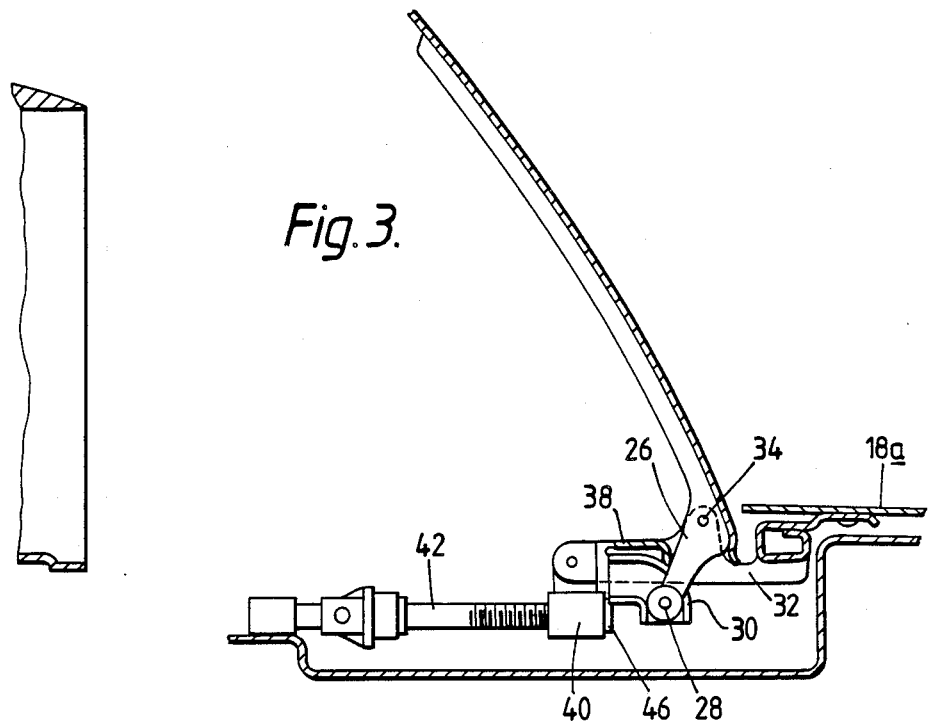
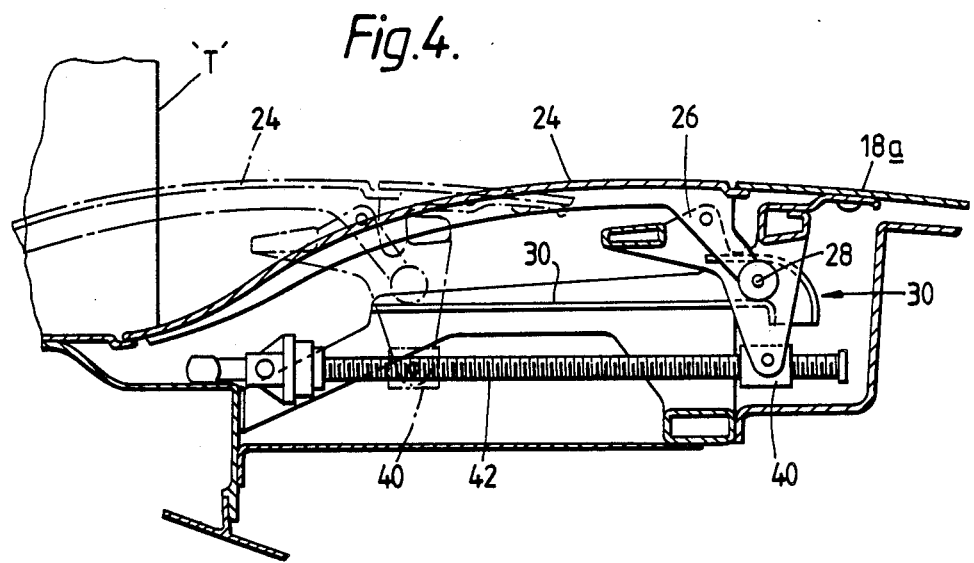

FLUID PROPULSION ENGINE WITH FLOW EXIT CONTROL DEVICE

This invention relates to fluid propulsion engines which power aircraft and during the course of operation of which, it is desired to affect the flow of propulsive fluids as they exit the engine. On the one hand, it might be desired to affect the exit flow so as to reduce the forward speed of an associated aircraft when on the ground, so as to shorten its landing run. Alternatively, it might be desired to affect the exit flow so as to ensure that the associated aircraft maintains stable flight.

As regards satisfying the former desire, it is known to employ flaps which, in a non operative mode, form part of the flow surfaces of the engine cowling and/or casing walls. In an operative mode, the flaps are caused to move across the fluid flow stream and so divert it in a direction which has a substantial radial component outwardly of the engine.

The invention firstly seeks to provide a gas turbine engine which includes an improved exit flow control device for the purpose of diverting propulsive fluid flow.

As regards the latter desire, this would arise in a situation where an engine fails in flight with the result that the drive to the rotating parts is removed. The rotating parts when windmill under the action of ram air, with the result that drag increases by a considerable order of magnitude. This can have disasterous consequences, particularly where the engine concerned is a ducted fan, gas turbine engine which has a large diameter fan, and more particularly where the duct outer wall is defined by a laminar flow cowl i.e. a cowl the profile of which is such as to achieve the absolute minimum of change in direction of flow of abmient air as it reaches the upstream extremity of the cowl intake and divides to flow therethrough and thereover. If an engine which has a laminar flow cowl fails, the windmilling fan will generate an air spillage with resultant turbulence around the air intake which it is thought, might literally cause the associated aircraft to crash.

The invention further seeks to provide an improved exit flow device for the purpose of at least reducing air intake spillage turbulence and associated drag.

According to an aspect of the present invention, a fluid propulsion engine includes an exit flow control device comprising a plurality of driven flaps which in an inoperative mode forms a peripheral portion of a propulsive fluid flow surface and are connected to the fluid propulsion engine for pivoting movement across the propulsive fluid path, wherein the pivot connection for each flap consists of a leg projecting radially inwardly with respect to the engine axis from the downstream end of the flap and terminating in a roller, a at least partially double walled guide track means affixed to the engine and which turns radially inwardly with respect to the engine axis, the roller being positioned so as to engage said track, bracket means pivotally connected to that end of the leg remote from the roller and to a bracket moving device which on actuation moves the bracket and via the bracket connection to the leg, moves the flap axially of the engine, wherein when said movement is in a downstream direction, the roller engages the inner surface of the outside curved wall and causes the flap to pivot to a position across the propulsive fluid flow.

The roller when the flaps are non operative, may be arranged so as to engage the track at a position adjacent the start of the radially inwardly directed turn thereof.

Preferably the fluid flow surface defines the inner wall of said fluid duct, or an extension thereto.

The moving means may comprise a plurality of screwjacks spaced equi-angularly around and within a casing of the fluid propulsion engine and fixed thereto by their ends which are remote from the bracket means.

Preferably the bracket means are mounted on upstream and downstream stiffening ring means which translate therewith. The downstream stiffening ring is affixed to that part of the fluid duct wall which is downstream of the flaps.

The peripheral array of flaps when non-operative and in conjunction with a cowl structure, may define the exit throat of the flow duct.

The peripheral array of flaps and the downstream duct wall extension may be translatable en mass axially of the engine prior to pivoting of the flaps into an operative position, so as to change the cross-sectional area of the exit throat.

Preferably further, slave flaps overlap each adjacent pairs of driven flaps and are connected thereto so as to enable covering of spaces which are formed between the driven flaps as they pivot into their operative attitudes.

Preferably the said moving means are utlised for the purpose of achieving both translation and pivoting of the peripheral array of flaps.

Said track means may be elongated so as to support the peripheral array of flaps and the downstream portion of the flow duct extension for said translation.

The invention will now be described, by way of example and with reference to the accompanying drawings in which:

FIG. 3 is a repeat of FIG. 2 but in an operating mode.

FIG. 4 is a diagrammatic view of a gas turbine engine incorporating a further embodiment of the present invention.

Figure 1:
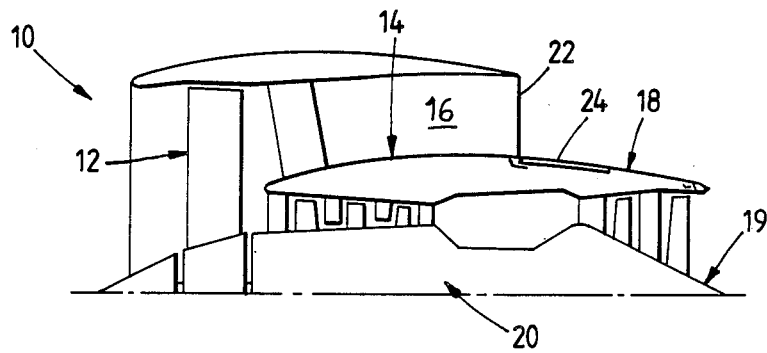
FIG. 1 is a diagrammatic view of a gas turbine engine incorporating one embodiment of the present invention.

In FIG. 1 a gas turbine engine 10 includes a ducted fan 12 in known manner. The inner wall 14 of the fan flow duct 16 is defined by the outer casing 18 of a core gas generator 20. A fan exhaust nozzle throat is defined by the plane 22 which in the present example is normal to the engine longitudinal axis.

A plurality of flow deflecting flaps 24 are arranged peripherally of the inner wall 14, such that in an inoperative mode as depicted in FIG. 1, they form a portion of the wall 14.

Figure 2:
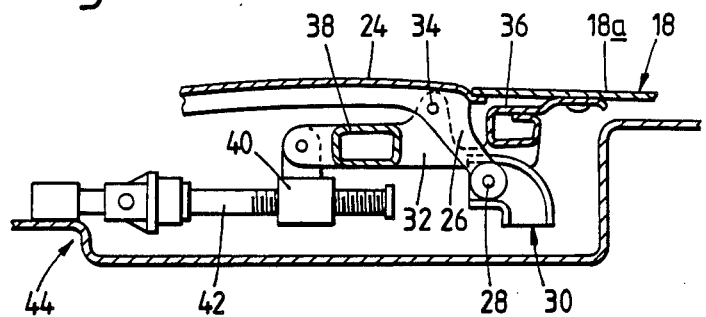
FIG. 2 is an enlarged, detailed part view of the engine of FIG. 1.

The flaps 24 are pivotally connected via their downstream ends to structure internally of the casing 18 which is more clearly seen in FIG. 2, to which reference is now made.

Each deflector flap 24 has a pair of lets 26 at its downstream end and each leg 26 supports a roller 28 at its extremity. The rollers 28 locate in short double walled tracks 30 the downstream ends of which turn radially inwardly towards the longitudinal axis of the engine 10 (FIG. 1).

Each leg 26 is pivotally connected to a bracket 32 at a point 34 intermediate the bracket ends. Each bracket 32 is in turn fixed to a stiffening ring 36 at its downstream end and the stiffening ring 36 is fixed to the downstream portion 18a of the core gas generator casing 18.

The upstream end of each bracket 32 is fixed to a stiff unison ring 38, the upstream face of which supports a number of equi angularly spaced ball nuts 40. Each ball nut 40 engages a ball screw 42 which in turn is carried by core gas generator structure 44, such that on actuation, each ball screw 42 rotates in its fixed location and drives a respective ball nut 40 axially thereof.

Referring now to FIG. 3 in which it is desired to deflect the exit flow laterally of the engine. The ball screws 42 are actuated in known manner, so as to move respective ball nuts 40 downstream, until they abut a shoulder 46 at the end of each ball screw 42. Alternatively, ring 36 may abut a stop member (not shown). The movement is transmitted via the unison ring 38 and the brackets 32 to the legs 26 of the flaps 24. Flaps 24 thus move downstream.

Immediately after the start of the movement and before the nuts 40 abut their respective shoulders 46, the rollers 28 engage the walls of the curved portion of their tracks 30 which as stated hereinbefore, are in fixed locations. Continued movement of the flaps 24 in a downstream direction thus generates a turning moment on the legs 26 and the flaps 24 begin to pivot in a clockwise direction, as viewed in the drawing. The brackets 32 and therefore the flaps pivot axes 34 move in straight lines. The rollers 28 thus move arcuately and radially inwards into the radially inwardly aligned portions of the track 30.

Retraction of the flaps 24 is achieved by reversing the direction of rotation of the ball screws 42, whereupon the rollers 28 abut the inner wall of the radially inwardly pointing track portion. The flaps 24 are thus caused to rotate in an anti clockwise direction as viewed in FIG. 3, to the position in which they provide part of the casing 18.

The casing portion 18a also translates with the brackets 26, so as to avoid fouling the downstream ends of the flaps 24.

It is seen from the foregoing description, that in response to a relatively short linear movement of the ball nuts 40, the flaps 24 achieve a large angular displacement. Thus where deflection per se is required, a very compact mechanism is enabled.

When the flaps 24 are pivoted outwards to their operative positions as depicted in FIG. 3, gaps will open up between adjacent pairs of flaps. These gaps may be obviated by the use of slave flaps (not shown) each one of which should be arranged to overlap an adjacent pair of flaps 24 in sliding relationships, in known manner.

Referring now to FIG. 4, when a gas turbine engine which has a large frontal area e.g. a ducted fan gas turbine engine of the kind described hereinbefore stops whilst its associated aircraft is in flight, then the windmilling fan blades could create sufficient drag as to render the aircraft incapable of flight.

One method of reducing the drag, is to open the throat of the fan duct nozzle and so reduce the resistance to the airflow through the duct. The present invention achieves this further exit flow control by shaping and positioning the array of flaps 24 such that during normal operation i.e. take off and cruise of an associated aircraft, the flaps 24 in combination with the fan cowl (not shown in FIG. 4) define the throat 'T'. The position and shape of the flaps 24 are shown in chain dotted lines in FIG. 4. In order that the flaps 24 may be so positioned, the tracks 30 and the ball screws 42 have been lengthened relative to that shown in FIGS. 1 to 3. This however, is the only modification needed in order to make the apparatus described in connection with FIGS. 1 to 3 suitable for achieving the second exit flow control now being described.

On engine cut out, the pilot actuates the ball screws 42 by any known means and thus the ball nuts 40 and therefore the associated structure 26, 24 and 18a move in a downstream direction, until such time as the rollers 28 reach a position immediately before the curved portion of the track 30, as shown in full lines in FIG. 4. By this means, the area of the throat 'T' is considerably increased.

Figure 5:
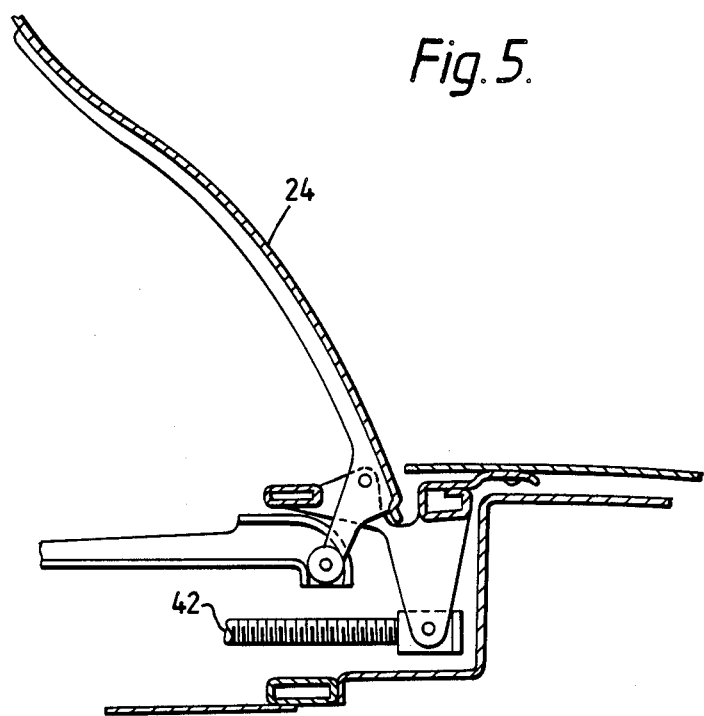
FIG. 5 is a repeat of FIG. 4 but in an operating mode.

On safe landing of the aircraft, if it is desired to utilise the flaps 24 as air brakes, rotation of the ball screw 42 is continued so as to achieve the effect depicted in FIG. 5, which is exactly that effect described in connection with FIGS. 1 to 3 inclusive.

Figure 6:
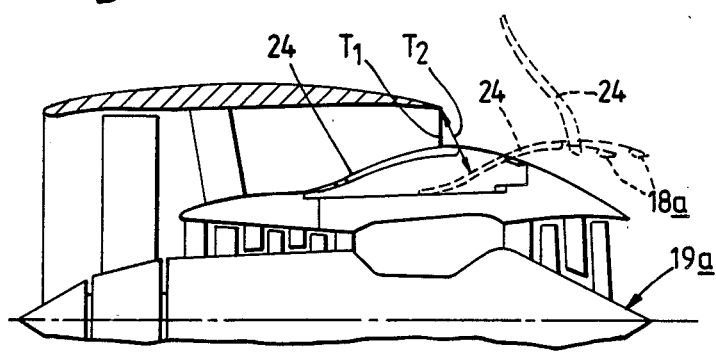
FIG. 6 is a diagrammatic view of a gas turbine engine incorporating the embodiments of FIGS. 4 and 5.

In FIG. 6 the flaps 24 are shown in full lines in a "cruise" position and throat 'T' is its least value. In a second, drag reducing position shown in dotted lines, the flaps 24 and casing portion 18a have been moved to a downstream position and a new, larger throat $T'_2$ is indicated by the double headed arrow.

In a third position, the flaps 24 have been moved further to effect pivoting and so achieve thrust deflection as described hereinbefore.

Both embodiments of the present invention which have been described hereinbefore, by way of example, refer to ducted fan gas turbine engines. The skilled man however, having read this specification, will appreciate that a gas turbine engine per se may be provided with either of the embodiments by providing and constructing exhaust bullets 19 (FIG. 1) and 19a (FIG. 6) in the manner of the core gas generator casing 18.

We claim:

1. A fluid propulsion engine including an exit flow control device comprising a plurality of driven flaps which in an inoperative mode form a peripheral portion of a propulsive fluid flow surface and are mounted for pivoting movement across a propulsive fluid flow path, wherein the pivot connection for each flap consists of a leg which projects radially inwardly with respect to the engine axis from the downstream end of the flap and terminates in a roller, an at least partially double walled guide track means which turns radially inwardly with respect to said axis, the roller being positioned so as to engage said track means, bracket means pivotally connected to an end of the leg remote from said roller and to a bracket moving device which on actuation moves the bracket and via the bracket connection to the leg, moves the flap axially of the engine, wherein when said movement is in a downstream direction, said roller engages the inwardly turned wall portion of the track means and causes the flap coupled thereto to pivot to a position across the propulsive fluid flow path, the bracket moving means comprising a plurality of screwjacks spaced equi-angularly around and within a casing of the fluid propulsion engine and fixed thereto by ends thereof which are remote from the bracket means, the brackets being affixed to and between upstream and downstream stiff rings, wherein the downstream stiff ring is affixed to a wall which defines a portion of the fluid flow surface which is immediately downstream of said flaps and moves with said brackets.

2. A fluid propulsion engine as claimed in claim 1 wherein the fluid flow surface defines an inner wall of said flow duct, or an extension thereto.

3. A fluid propulsion engine as claimed in claim 1 or 2 wherein said rollers engage the track means at a position adjacent a start of the radially inwardly directed turn thereof when the flaps are in their inoperative mode.

4. A fluid propulsion engine as claimed in claim 1 or 2 wherein the flaps when in their inoperative mode, combine with a cowl structure to define the throat of an exhaust nozzle of said engine and are movable relative to the cowl structure firstly to increase the throat area by an order of magnitude and secondly to achieve pivoting of the flaps across the propulsive fluid flow.

5. A fluid propulsion engine as claimed in claim 5 comprising a ducted fan gas turbine engine and wherein said throat is the throat of the fan duct.

6. A fluid propulsion engine as claimed in claim 3 comprising a gas turbine engine and wherein said throat is the throat of the turbine exhaust duct.

7. A fluid propulsion engine as claimed in claim 4 comprising a ducted fan gas turbine engine and wherein said throat is the throat of the fan duct.

8. A fluid propulsion engine as claimed in claim 4 comprising a gas turbine engine and wherein said throat is the throat of the turbine exhaust duct.

* * * * *